(12) United States Patent
Cuomo et al.

(10) Patent No.: US 10,031,904 B2
(45) Date of Patent: Jul. 24, 2018

(54) DATABASE MANAGEMENT SYSTEM BASED ON A SPREADSHEET CONCEPT DEPLOYED IN AN OBJECT GRID

(71) Applicant: INTERNATIONAL BUSINESS MACHINES CORPORATION, Armonk, NY (US)

(72) Inventors: Gennaro A. Cuomo, Durham, NC (US); Victor S. Moore, Lake City, FL (US)

(73) Assignee: International Business Machines Corporation, Armonk, NY (US)

(*) Notice: Subject to any disclaimer, the term of this patent is extended or adjusted under 35 U.S.C. 154(b) by 324 days.

(21) Appl. No.: 14/318,929

(22) Filed: Jun. 30, 2014

(65) Prior Publication Data

US 2015/0378980 A1     Dec. 31, 2015

(51) Int. Cl.
*G06F 17/30* (2006.01)
*G06F 17/24* (2006.01)

(52) U.S. Cl.
CPC ...... *G06F 17/246* (2013.01); *G06F 17/30011* (2013.01); *G06F 17/30324* (2013.01)

(58) Field of Classification Search
CPC ............. G06F 17/246; G06F 17/30011; G06F 17/30324
See application file for complete search history.

(56) References Cited

U.S. PATENT DOCUMENTS

| | | | | | |
|---|---|---|---|---|---|
| 5,524,253 | A | * | 6/1996 | Pham | G06F 9/46 703/27 |
| 5,806,078 | A | * | 9/1998 | Hug | G06F 17/2288 707/999.202 |
| 6,006,230 | A | * | 12/1999 | Ludwig | G06F 9/548 |
| 6,023,691 | A | * | 2/2000 | Bertrand | G06F 17/246 706/2 |
| 6,336,128 | B1 | * | 1/2002 | Eisenmann | G05B 19/0421 709/200 |
| 7,107,519 | B1 | * | 9/2006 | Webster | G06F 17/246 715/212 |
| 7,237,268 | B2 | * | 6/2007 | Fields | G06F 21/606 709/203 |
| 7,979,412 | B2 | | 7/2011 | Johnson et al. | |
| 8,281,326 | B2 | | 10/2012 | Foster et al. | |
| 8,620,852 | B1 | * | 12/2013 | Kipersztok | G06N 5/04 706/46 |
| 9,208,211 | B2 | | 12/2015 | Surtani et al. | |
| 9,569,475 | B2 | | 2/2017 | Hoang et al. | |
| 2002/0007380 | A1 | * | 1/2002 | Bauchot | G06F 17/246 715/212 |
| 2003/0041040 | A1 | * | 2/2003 | Bertrand | G09B 7/04 706/12 |

(Continued)

*Primary Examiner* — Shiow-Jy Fan
(74) *Attorney, Agent, or Firm* — Edward J. Wixted, III (57) ABSTRACT

A method for interacting with a database stored in an object grid is described. The database is given attributes of a spreadsheet. Elements stored in the database are represented and addressed as cells of a spreadsheet. Cells can store data objects, including formulas, and executable scripts. The spreadsheet can evaluate formulas, carry out the program instructions of executable scripts, and perform complex event processing. Interaction with the spreadsheet is accomplished through the use of structured data messages which include instructions, spreadsheet and cell addressing and, optionally, data elements.

12 Claims, 5 Drawing Sheets

(56) References Cited

U.S. PATENT DOCUMENTS

| | | | |
|---|---|---|---|
| 2004/0128146 A1 | 7/2004 | Williams et al. | |
| 2005/0273281 A1* | 12/2005 | Wall | G01D 4/004 |
| | | | 702/60 |
| 2006/0036770 A1* | 2/2006 | Hosn | H04L 67/2819 |
| | | | 709/248 |
| 2008/0301135 A1* | 12/2008 | Alves | G06F 17/30442 |
| 2010/0269092 A1* | 10/2010 | Dorman | G06F 9/45512 |
| | | | 717/106 |
| 2010/0332373 A1* | 12/2010 | Crabtree | G06Q 50/06 |
| | | | 705/37 |
| 2012/0151315 A1* | 6/2012 | Campbell | G06F 17/246 |
| | | | 715/212 |
| 2013/0097430 A1* | 4/2013 | Mittelstadt | G06F 21/6227 |
| | | | 713/189 |
| 2014/0074817 A1* | 3/2014 | Neels | G06F 17/30424 |
| | | | 707/711 |
| 2014/0324864 A1* | 10/2014 | Choe | G06F 17/30823 |
| | | | 707/737 |

\* cited by examiner

DATABASE MANAGEMENT SYSTEM BASED ON A SPREADSHEET CONCEPT DEPLOYED IN AN OBJECT GRID

BACKGROUND OF THE INVENTION

The present invention relates generally to the field of database management systems and more particularly to a database management system based on a spreadsheet concept and deployed within an object grid.

A database management system (DBMS) is a software application that interacts with databases, users and other software applications to store, query, update, analyze, report and manage data. A well-known DBMS is for example, IBM DB2 Database Software. One language commonly used to interact with a DBMS is Structured Query Language (SQL).

An object grid is a distributed data cache, comprising a plurality of computers, to store and retrieve data objects. Benefits provided by an object grid include the ability to process great quantities of data, very quickly, with a high degree of availability and reliability. Risk of data loss is very low due to object grid techniques including data and server redundancy, fault tolerance, automatic failover techniques, etc.

SUMMARY

Embodiments of the present invention disclose a computer-implemented method, computer program product, and system for interacting with a database, wherein an object grid backbone maps the database onto a plurality of servers, and the database includes one or more spreadsheets managed by one or more spreadsheet applications, wherein content of the spreadsheets is stored in the database. The method comprises directing, by one or more processors, a message via the object grid to a designated spreadsheet application, based, at least in part, on name fields included in the message, such that the designated spreadsheet application interacts with one or more cells of the spreadsheet in accordance with content derived from the message; utilizing, by one or more processors, a structured data message format for transmission to the designated spreadsheet application, such that the message includes at least one of: a database command, a target array expressed as one or more spreadsheet cell addresses, wherein a spreadsheet cell address includes at least a row index and a column index, and one or more data objects; wherein the structured data message is transmitted to the designated spreadsheet application through message routing over the object grid backbone; and interacting, by one or more processors, with the database by the spreadsheet application, in accordance with the content of the structured data message.

DETAILED DESCRIPTION

Embodiments in accordance with the present invention create a database management system (DBMS), having attributes of a spreadsheet paradigm, and deployed in an object grid. Further, the spreadsheet paradigm is expanded to create additional functionalities. Throughout this disclosure, the database management system (DBMS) envisioned by embodiments in accordance with the present invention shall be referred to with the term "spreadsheet application."

A spreadsheet is a computer implemented method of representing data objects in tabular form. In a spreadsheet, data objects are represented as cells of an array, organized in rows and columns. A spreadsheet employs an addressing scheme wherein a cell address is expressed as a column index and a row index. A cell can hold a data object, which can be, for example, numeric data (including integer or floating point numbers), binary data, a text string, or Boolean values (true or false), etc. Each cell can be associated with a formula that automatically computes a value, based, for example, on the contents of other cells, the result of the formula being stored in the same cell as is associated with the formula. A spreadsheet application typically makes available a set of functions, for use in formulae, such as mathematical functions, statistical operations, logical comparisons, time and date operations, as well as lookup and referencing functions, etc.

A cell associated with a formula can hold a result determined by the formula. When data in a cell referenced by a formula is changed, the value stored in the cell is automatically updated to reflect the new result. For example, if cells A1 and A2 contain the numbers 1 and 2 respectively, and cell A3 contains the formula "A1+A2," cell A3 will hold the number 3 (the sum of 1 and 2). If the value in cell A1 is then changed to 5, after evaluating the formula, the spreadsheet application will update cell A3 with the new value, 7 (the sum of 5 and 2).

Embodiments in accordance with the present invention provide for executable scripts to be stored in spreadsheet cells, wherein an executable script can be addressed in the same fashion as other data objects, i.e., by a column index and a row index. An executable script can be triggered by the spreadsheet application in response to having received a command to "read" the cell holding the executable script. Further, an executable script can be triggered, for example, upon occurrence of a specified event, upon a change in the value of a given cell, or according to a specified schedule, etc. The result, as determined by the executable script, may be stored in the spreadsheet, returned to the client, or otherwise disposed, as directed by the executable script.

At least one embodiment in accordance with the present invention implements complex event processing. Complex event processing includes an ability to perform a temporal analysis. A temporal analysis can answer questions involving, for example, parameters that change over time. For example, consider data stored in a consecutive series of spreadsheet rows, the data representing a chronological record of a particular process control parameter. Complex event processing could answer a question such as: "In cells A1 through A500 and B1 through B500, how many times did the value in column "A" change from a first value to a second value and back to the first value?" Another example question that could be answered with complex event processing is: "How many times did a difference, greater than a specified value, between the value in column "A," and the respective value in column "B" persist for longer than a specified interval of time?" In simple terms, the preceding question could be related to assessing the output performance of a servo system relative to its control input.

Complex event processing further includes the ability, automatically, to send data for analysis by an external process, such as for example, IBM's JRules business rules engine or the IBM Operational Decision Manager. Upon completion of the analysis by an external process, the result can be stored back into the spreadsheet and can be returned to a client.

In embodiments in accordance with the present invention, commands, data objects and other elements are passed between the spreadsheet application and the client by means of a data message. Data objects embedded in the message are used, in unchanged form, by the spreadsheet application. A more detailed treatment of the messaging concept is provided below with reference to FIGS. 3 and 4 and their respective detailed descriptions.

To marshal a data object is to transform the object's memory representation to a format suitable for storage or transmission. When a marshalled object is "unmarshalled," the original object is recovered. Embodiments in accordance with the present invention do not employ marshalling. Instead, a binary representation of the data objects is utilized, facilitating efficient transmission and storage of data objects, thereby avoiding the expenditure of processing resources and performance degradation associated with marshalling.

Data may contain modifiers and symbols to denote data types and characteristics (such as "Floating point, rounded to 4 significant figures" or "Character string," etc.) of individual data objects. The spreadsheet application uses these modifiers and symbols to properly convert the data to the internal format of the spreadsheet. The data is written to the database in the internal format of the spreadsheet, without modification. The internal format is used for all subsequent processing. The spreadsheet application can convert the internal data format of the spreadsheet into human readable form, for example, to create human readable output.

Figure 1:
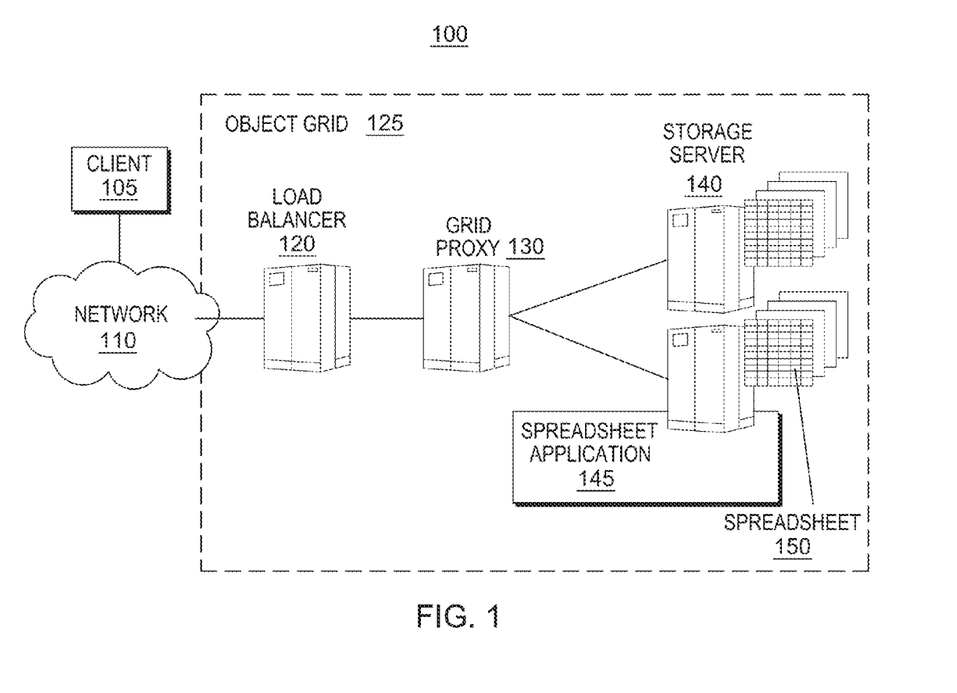
FIG. 1 is a representation of a database management system, referred to as a spreadsheet application, generally designated with numeral 100, operating within an object grid environment in an illustrative embodiment in accordance with the present invention.

An illustrative embodiment in accordance with the present invention will now be described in detail, beginning with reference to FIG. 1, a representation of a database management system, hereinafter referred to as spreadsheet application 145, operating within an object grid environment, generally designated with the numeral 100.

An object grid forms the backbone of a powerful data storage system. Object grid 125 is a distributed data cache comprising one or more of storage server 140 to store cached data, one or more of grid proxy 130 to route messages within the grid and to catalogue where cached data is stored within object grid 125. A cached data file may be distributed within the grid, wherein it is replicated and stored on more than one server. A cached data file may have a primary replica and one or more secondary replicas to act as backup should the primary replica become lost, corrupted, or otherwise unusable or unavailable. A more detailed treatment of the cached data file distribution within the grid is provided with reference to FIG. 2 and the detailed description thereof.

Object grid 125 further comprises at least one load balancer 120, the function of which is to monitor the workload across the machines in object grid 125, and to distribute workload among them in such a fashion as to minimize processing bottlenecks and maximize throughput. Object grid 125, employing load balancing, data replication and other techniques, is able to process great volumes of data quickly with high degrees of reliability, redundancy and availability.

Integral to object grid 125 is grid proxy 130. Grid proxy 130 uses hash tables to determine the routing of data messages, and storage locations of cached data, within the object grid 125. A more detailed treatment of grid proxy 130 is given in the detailed description with respect to FIG. 2.

Object grid 125 may further comprise at least one storage server 140, operationally coupled to one or more of spreadsheet application 145. Spreadsheet 150 is managed by spreadsheet application 145, operating in concert with client 105 in embodiments in accordance with the present invention. Client 105 is identified by an address such that a message, sent from spreadsheet application 145, may be routed to client 105 by reference to the address. Client 105 and storage server 140 may include internal and external hardware components, as depicted and described in further detail with respect to FIG. 5.

In general, a spreadsheet is based on a two-dimensional array construct, wherein a cell can be addressed by two indices: A column index; and a row index. A two-dimensional array can be conceptualized as a rectangular grid.

However, an array and a spreadsheet need not be limited to two dimensions. For example, a three-dimensional spreadsheet could have a layer index, a column index and a row index, the specification of all three indices being required to address a cell. A three-dimensional spreadsheet can be conceptualized as cubic-like, having length, width and height. In similar fashion, a four-dimensional spreadsheet would require four indices to address a cell and there is no conceptual prohibition against having yet higher-order spreadsheets as well.

While some embodiments in accordance with the present invention envision spreadsheet concepts having more than two dimensions, for simplicity, only a two-dimensional concept will be described in this disclosure. It is to be understood that the concepts described herein are extensible, and can be applied to a higher-order spreadsheet construct.

In embodiments in accordance with the present invention, client 105 may be a mainframe computer, a laptop computer, a desktop computer, or any electronic device capable of communicating with network 110 and spreadsheet application 145. Client 105 can operate in concert with spreadsheet application 145, to control the functions and actions of spreadsheet application 145, and in turn, the contents of spreadsheet 150. Client 105 may include internal and external hardware components, as depicted and described in further detail with respect to FIG. 5.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client 105 and spreadsheet application 145.

Figure 2:
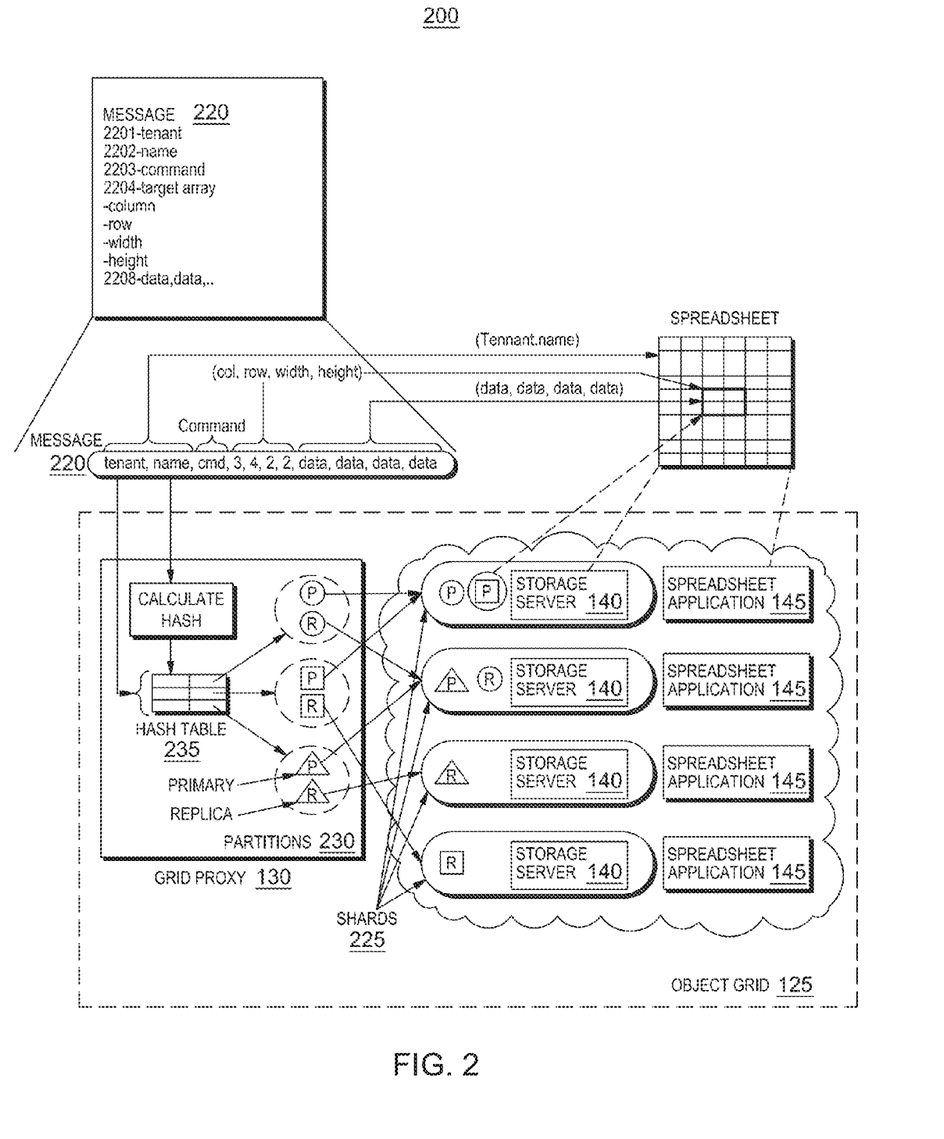
FIG. 2, generally designated with numeral 200, depicts aspects of object grid architecture in conjunction with a spreadsheet paradigm, in an embodiment in accordance with the present invention.

FIG. 2, generally designated with numeral 200, depicts aspects of object grid architecture in conjunction with a spreadsheet paradigm, in an embodiment in accordance with the present invention. Object grid 125 comprises one or more of storage server 140, storing a collection of shards 225. A shard is a container for storing data. A shard may be a primary shard or a replica shard. A replica shard is a copy of a primary shard. A primary shard is paired with one or more replica shards. A primary shard and its one or more replicas are typically stored on different storage server 140 hardware, for redundancy protection against a failure of even an entire storage server 140. Partitions 230 hold references to shards 225. In embodiments in accordance with the present invention, each spreadsheet 150 is stored in a shard.

Incoming message 220 is mapped, to a destination storage server 140, by hash table 235. Grid proxy 130 computes a hash value, using information derived from message 220, such information comprising tenant 2201 in combination with name 2202. Grid proxy 130 uses this hash value as an index into hash table 235, to retrieve the corresponding partition. Grid proxy 130 sends the incoming message to the destination servers identified by the retrieved primary and replica partitions.

Message 220 is a self-contained, structured data message, conforming to a Representational State Transfer (REST) architecture. Message 220 may be sent from client 105 to spreadsheet application 145, or from spreadsheet application 145 to client 105. Message 220 may comprise attribute-value pairs, formatted as, for example, a JavaScript Object Notation (JSON) data structure. In an embodiment in accordance with the present invention, a JSON data format is a means for passing data to and from spreadsheet application 145. It is to be understood that references to the particular data structure presented and described herein, are not to be construed as limitations upon the data format that can be utilized in embodiments in accordance with the present invention.

Message 220 comprises a complete data package, to direct a transaction in spreadsheet 150. Message 220 comprises a target spreadsheet identifier, target cells within the spreadsheet, a database command and optionally, data. More particularly, message 220 may comprise at least a spreadsheet owner and a spreadsheet identifier (tenant 2201 and name 2202, respectively), command 2203 (for example, "create," "read," "update," "delete" or other database commands as may be implemented in spreadsheet application 145 in embodiments in accordance with the present invention), target array 2204, and optionally, data 2208. Data field 2208 may be empty for some types of messages, such as for example, a message containing a "Read" command.

In an embodiment in accordance with the present invention, target array 2204 may be specified, for example, as a column, a row, a width, and a height. The column and row indices identify a cell, represented as the upper left hand corner, of target array 2204. The width and height respectively specify the number of columns and rows included in target array 2204. It is to be understood that target array 2204 may be specified with formats other than the foregoing, such as, but not limited to, discrete references to individual cells, or discrete references to two diagonally opposed corners of a rectangular target array 2204.

Figure 3:
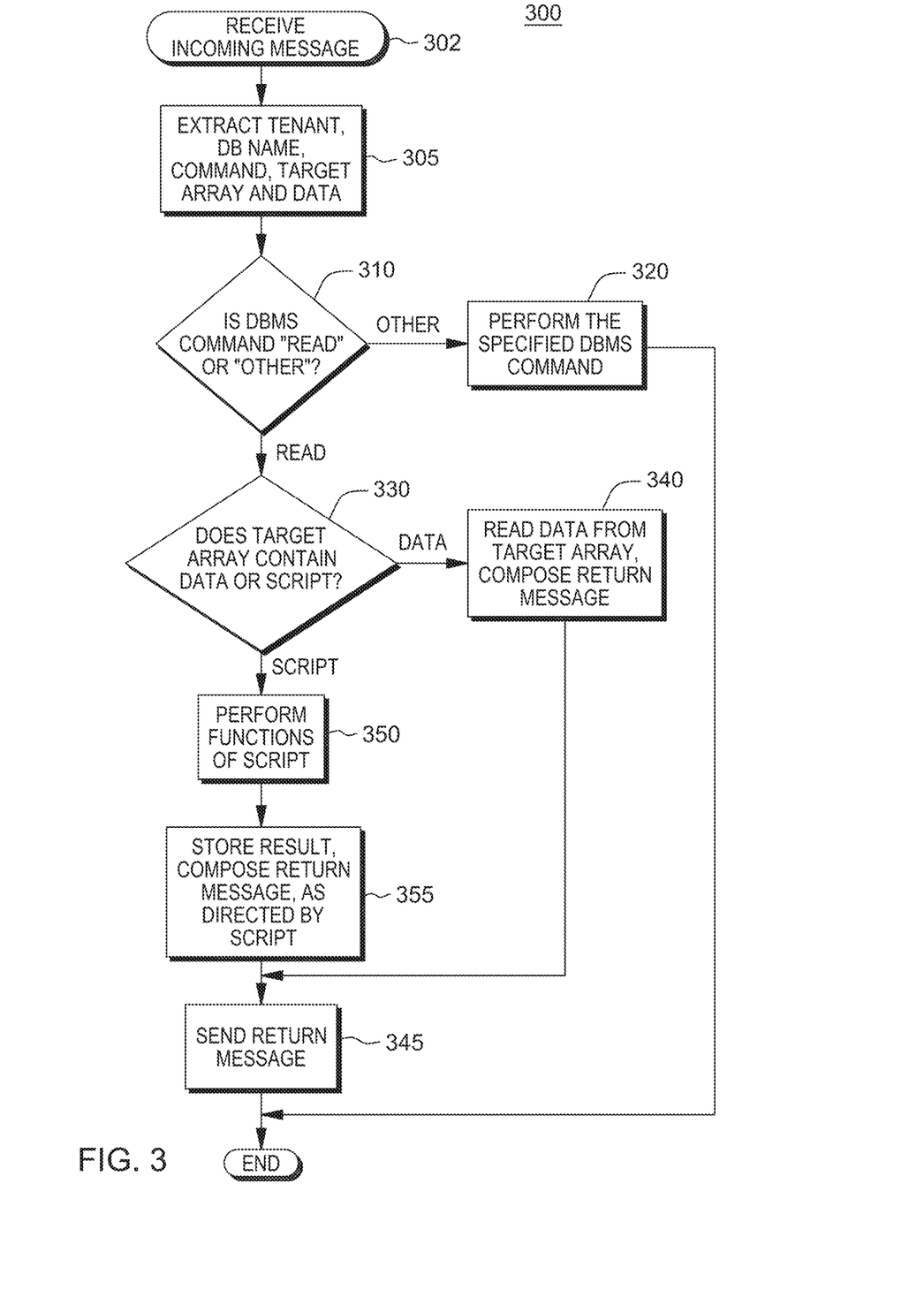
FIG. 3 is a flowchart, generally designated with numeral 300, representing operations performed by a spreadsheet application, acting in an illustrative embodiment in accordance with the present invention.

FIG. 3 is a flowchart, generally designated with numeral 300, representing operations performed by spreadsheet application 145, acting in an illustrative embodiment in accordance with the present invention. Message 220 is routed from client 105 to spreadsheet application 145 through network 110 and object grid 125.

Responsive to receipt of message 220 (function block 302), spreadsheet application 145 parses message 220 to extract its several components, in particular, at least tenant 2201, name 2202, command 2203, target array 2204 and optionally, data 2208 (function block 305).

Storage server 140, operating within object grid 125, may contain multiple instances of spreadsheet 150, each instance belonging to tenant 2201 or to other tenants. Tenant 2201 and name 2202, together, identify a specific spreadsheet 150, at which message 220 is directed. Spreadsheet application 145 interprets command 2203 to determine what actions to perform with respect to spreadsheet 150 (decision 310).

In a case where command 2203 is not a type of "Read" command, (decision 310, "Other" branch), spreadsheet application 145 responds by performing the specified command with respect to target array 2204 in spreadsheet 150 (function block 320). A command that is not a type of "Read" command may be a type of "Write" command, such as "Create," "Update," or any other command that causes a data object to be written in the spreadsheet.

Various types of a "Read" command include "Select," "Read," "Get," "Copy" or any other command that causes a data object to be read from a cell at which the command is directed. In a case where command 2203 is a type of "Read" command (decision 310, "Read" branch), spreadsheet application 145 examines the content existing in spreadsheet 150, at target array 2204, to determine whether such content comprises data object(s) or an executable script (decision 330). If the requested data at target array 2204 comprises a data object, (decision 330, "Data" branch), spreadsheet application 145 reads the data object from target array 2204 and composes a message to include at least the data from target array 2204 (function block 340). Spreadsheet application 145, assigns a recipient address, derived from message 220 or metadata associated with message 220, and sends the message to client 105 (function block 345).

In the case where target array 2204 comprises a script (decision 330, "Script" branch), spreadsheet application 145 performs functions as directed by the script (function block 350). Spreadsheet application 145 may send the results of the script to client 105 (function block 355). Further, spreadsheet application 145 may store the results of the script in spreadsheet 150, or in another spreadsheet, as directed by the script, for example, or as directed by other information that may be encoded in message 220 to characterize a desired operation.

Figure 4:
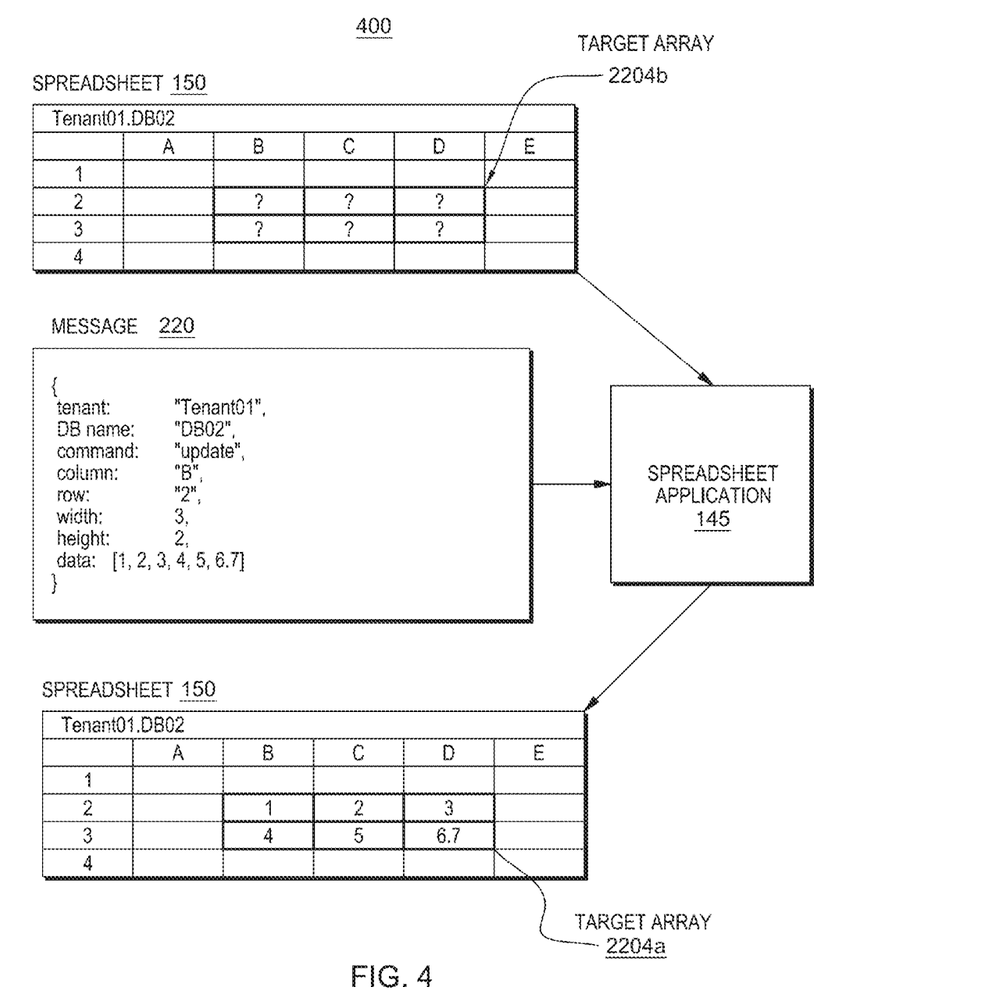
FIG. 4, generally designated with numeral 400, depicts a subset of an example spreadsheet, including a target array, before and after processing of a data message, in an embodiment in accordance with the present invention.

FIG. 4, generally designated with numeral 400, depicts a subset of an example spreadsheet 150, the subset including target array 2204, before and after processing of message 220, in an embodiment in accordance with the present invention. Target array 2204, before processing of message 220, is identified with numeral 2204*b*. The cells of target array 2204, before processing of message 220, can respectively contain any data object, or no data object, in any combination. Target array 2204, after processing of message 220, is identified with numeral 2204*a*.

Message 220, as illustrated in FIG. 4, depicts one possible data format, in an embodiment in accordance with the present invention. Message 220 identifies a tenant ("Tenant01") and a spreadsheet name ("DB02"). Together, tenant and spreadsheet name ("Tenant01.DB02") identify a specific instance of spreadsheet 150, at which message 220 is directed. Message 220, as illustrated, further comprises a database command ("update"), a target array (specified by "column," "row," "width," and "height" respectively) and data (integers 1 through 5 and floating point number 6.7).

The cells of target array 2204, before processing of message 220 (numeral 2204*b*), may each respectively contain a data object, or no data object, in any combination. For purposes of the present example, it is of no concern what, if anything, is stored in target array 2204*b*. The cells of target array 2204, after processing of message 220 (numeral 2204*a*), contain data objects as specified in message 220, specifically, in this example, the integers 1 through 5 and the floating point number 6.7 respectively.

Figure 5:
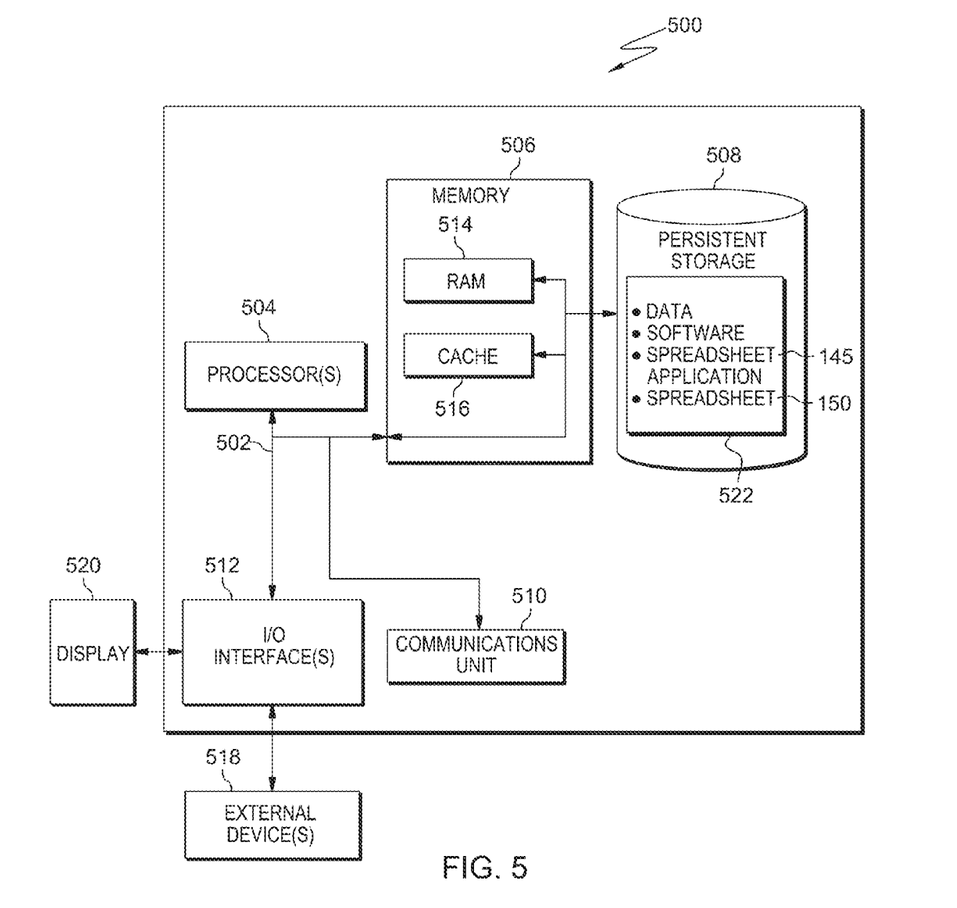
FIG. 5 is a functional block diagram of a computer system, generally designated with numeral 500, in an embodiment in accordance with the present invention.

FIG. 5 is a functional block diagram of a computer system, generally designated with numeral 500, in an embodiment in accordance with the present invention. FIG. 5 depicts computer system 500, which is representative of client 105, data structures, or other resources in accordance with an illustrative embodiment in accordance with the present invention. FIG. 5 is also representative of storage server 140 in an embodiment in accordance with the present invention. It should be appreciated that FIG. 5 provides only an illustration of one implementation and does not imply any limitations with regard to the environments in which different embodiments in accordance with the present invention may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer-readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer-readable storage device. Software and data 522 are stored in persistent storage 508 for access and/or execution by processors 504 via one or more memories of memory 506. With respect to client 105, for example, software and data 522 can represent possible associated data structures, software and resources, and any requisite disk workspace. It should be noted that processor or processors 504 may host more than one client-side application. With respect to computer systems within object grid 125, software and data 522 can represent software applications and data within each respective computer system.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage devices capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other sub-systems or devices. In an embodiment, communications unit 510 may provide appropriate interfaces to the Network 110 or other suitable data communications network to connect to one or more computer systems within an embodiment in accordance with the present invention. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data 522 can be stored on such portable computer-readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising a database management system (a DBMS) configured to perform:
    receiving from a user computer, a command message including at least a database identifier, a binary coded data component, a database command, a first row index, and a first column index;
    computing a hash value based at least in part on the first row index and the first column index extracted from the command message;
    indexing into a hash table, based at least in part on the hash value, to retrieve a corresponding partition of an object grid storage system comprising a plurality of storage servers including a destination storage server having a first object grid storage address;
    sending the command message to the destination storage server identified by the corresponding partition of the object grid storage system; and
    performing the database command with respect to the first object grid storage address;
    on condition that the database command is a complex command:
        retrieving data from the first object grid storage address,
        sending the retrieved data to an external analysis engine, receiving a result from the external analysis engine,
composing a return message including at least the result, and
sending the return message to the user computer;
wherein:
the first row index and the first column index, in combination, comprise a reference, resolvable to the first object grid storage address; and
the binary coded data component comprises one or more of: (i) a computer file; and (ii) executable code.

2. The method of claim 1, wherein the command message is formatted as a representational state transfer (REST) structured data message.

3. The method of claim 2, on condition that the database command is a WRITE command, further comprising:
writing, in an unchanged format, and at the first object grid storage address, the data of the binary coded data component of the command message;
wherein the unchanged format means a format of the binary coded data component of the command message is preserved at the first object grid storage address.

4. The method of claim 1, on condition that the database command is a READ command, further comprising:
retrieving data stored at the first object grid storage address;
composing a return message, including a data component comprising the retrieved data in an unchanged format; and
sending the return message to the user computer;
wherein the unchanged format means a format with which the retrieved data is stored at the first object grid storage address is preserved in the data component of the return message.

5. A computer program product comprising a database management system (a DBMS) and further comprising one or more computer readable storage media and program instructions stored on the one or more computer readable storage media, the program instructions comprising instructions to perform:
receiving from a user computer, a command message including at least a database identifier, a database command, a binary coded data component, a first row index, and a first column index;
computing a hash value based at least in part on the first row index and the first column index extracted from the command message;
indexing into a hash table, based at least in part on the hash value, to retrieve a corresponding partition of an object grid storage system comprising a plurality of storage servers including a destination storage server having a first object grid storage address;
sending the command message to the destination storage server identified by the corresponding partition of the object grid storage system; and
performing the database command with respect to the first object grid storage address;
on condition that the database command is a complex command:
retrieving data from the first object grid storage address,
sending the retrieved data to an external analysis engine,
receiving a result from the external analysis engine,
composing a return message including at least the result, and
sending the return message to the user computer
wherein:
the first row index and the first column index, in combination, comprise a reference, resolvable to the first object grid storage address; and
the binary coded data component comprises one or more of: (i) a computer file; and (ii) executable code.

6. The computer program product of claim 5, wherein the command message is formatted as a representational state transfer (REST) structured data message.

7. The computer program product of claim 6, on condition that the database command is a WRITE command, further comprising program instructions comprising instructions to perform:
writing, in an unchanged format, and at the first object grid storage address, the data of the binary coded data component of the command message;
wherein the unchanged format means a format of the binary coded data component of the command message is preserved at the first object grid storage address.

8. The computer program product of claim 5, on condition that the database command is a READ command, further comprising program instructions comprising instructions to perform:
retrieving data stored at the first object grid storage address;
composing a return message, including a data component comprising the retrieved data in an unchanged format; and
sending the return message to the user computer;
wherein the unchanged format means a format with which the retrieved data is stored at the first object grid storage address is preserved in the data component of the return message.

9. A computer system comprising a database management system (a DBMS) and further comprising:
one or more computer processors;
one or more computer-readable storage media; and
program instructions stored on the computer-readable storage media for execution by at least one of the one or more processors, the program instructions comprising instructions to perform:
receiving from a user computer, a command message including at least a database identifier, a database command, a binary coded data component, a first row index, and a first column index,
computing a hash value based at least in part on the first row index and the first column index extracted from the command message,
indexing into a hash table, based at least in part on the hash value, to retrieve a corresponding partition of an object grid storage system comprising a plurality of storage servers including a destination storage server having a first object grid storage address,
sending the command message to the destination storage server identified by the corresponding partition of the object grid storage system, and
performing the database command with respect to the first object grid storage address,
on condition that the database command is a complex command:
retrieving data from the first object grid storage address,
sending the retrieved data to an external analysis engine,
receiving a result from the external analysis engine,
composing a return message including at least the result, and
sending the return message to the user computer, wherein:
the first row index and the first column index, in combination, comprise a reference, resolvable to the first object grid storage address; and
the binary coded data component comprises one or more of: (i) a computer file; and (ii) executable code.

10. The computer system of claim 9, wherein the command message is formatted as a representational state transfer (REST) structured data message.

11. The computer system of claim 10, on condition that the database command is a WRITE command, further comprising program instructions comprising instructions to perform:
writing, in an unchanged format, and at the first object grid storage address, the data of the binary coded data component of the command message;
wherein the unchanged format means a format of the binary coded data component of the command message is preserved at the first object grid storage address.

12. The computer system of claim 9, on condition that the database command is a READ command, further comprising program instructions comprising instructions to perform:
retrieving data stored at the first object grid storage address;
composing a return message, including a data component comprising the retrieved data in an unchanged format; and
sending the return message to the user computer;
wherein the unchanged format means a format with which the retrieved data is stored at the first object grid storage address is preserved in the data component of the return message.

\* \* \* \* \*